United States Patent [19]

Reussner et al.

[11] Patent Number: 5,517,672
[45] Date of Patent: May 14, 1996

[54] MULTI-CHANNEL DEVICE HAVING STORAGE MODULES IN A LOOP CONFIGURATION WITH MAIN CONTROL UNIT FOR CONTROLLING DATA RATES AND MODIFYING DATA SELECTIVELY AND INDEPENDENTLY THEREIN

[76] Inventors: Thomas M. Reussner, Arheilger Strasse 48, 6100 Darmstadt; Michael T. Britting, Sofienstrasse 30, 6839 Oberhausen, both of Germany

[21] Appl. No.: 190,219

[22] Filed: Feb. 1, 1994

Related U.S. Application Data

[63] Continuation of Ser. No. 784,449, Nov. 13, 1991, abandoned.

[30] Foreign Application Priority Data

Mar. 13, 1990 [DE] Germany ............................ 40 08 081.1

[51] Int. Cl.$^6$ ......................................... G06F 13/00
[52] U.S. Cl. ........................ 395/872; 395/827; 364/236.3; 364/238.6; 364/239.1; 364/DIG. 1
[58] Field of Search ............................ 395/250, 275; 355/872, 827; 360/8, 13, 16, 17, 27, 55; 369/3, 14, 15, 83, 86, 176, 177, 178

[56] References Cited

U.S. PATENT DOCUMENTS

| | | | |
|---|---|---|---|
| 4,098,625 | 9/1977 | Harris, Jr. et al. | 395/250 |
| 4,206,476 | 6/1980 | Hashimoto | 358/127 |
| 4,365,313 | 12/1982 | Menezes et al. | 360/14.3 |
| 4,868,737 | 9/1989 | Soedelund | 364/200 |
| 4,907,186 | 3/1990 | Racey | 395/250 |
| 4,956,772 | 9/1990 | Neches | 364/200 |
| 5,041,963 | 8/1991 | Ebersole et al. | 364/200 |
| 5,163,136 | 11/1992 | Richmond | 395/275 |
| 5,208,913 | 5/1993 | Yamamoto | 395/250 |

OTHER PUBLICATIONS

Technische Mitteilungen des RFZ, Band 34, Nr. 1, Mar. 1990, pp. 1–8.
AES Preprint 2317(A5), 80th Convention, Mar. 4–7, 1986.

*Primary Examiner*—Thomas C. Lee
*Assistant Examiner*—Sang Hui Kin
*Attorney, Agent, or Firm*—Jacobson, Price, Holman & Stern

[57] ABSTRACT

It is disclosed a multi-channel device for the digital recording and playback of audio signals, with a plurality of digital or analogue inputs and outputs and with one or more digital stores. For providing, with a not limited number of channels for recording and playback, possibilities for recording and playback over an unlimited period of time, with instantaneous access to any desired position of the recording, and carrying out overdubbing and editing without risk and freely selecting the time duration of the cross-fading, a bidirectional interface circuit with inputs and outputs is connected via a system-bus which conducts groups of parallel data, to one or more parallel connected storage modules, wherein a main control circuit driven by an operating unit is coupled to the system-bus and to the storage module or modules, and wherein each storage module comprises at least one digital store, containing an exchangeable storage medium, and at least one digital buffer store such that the audio signals which are to be stored are kept available in the buffer store for their processing or during the exchange of the storage medium.

13 Claims, 1 Drawing Sheet

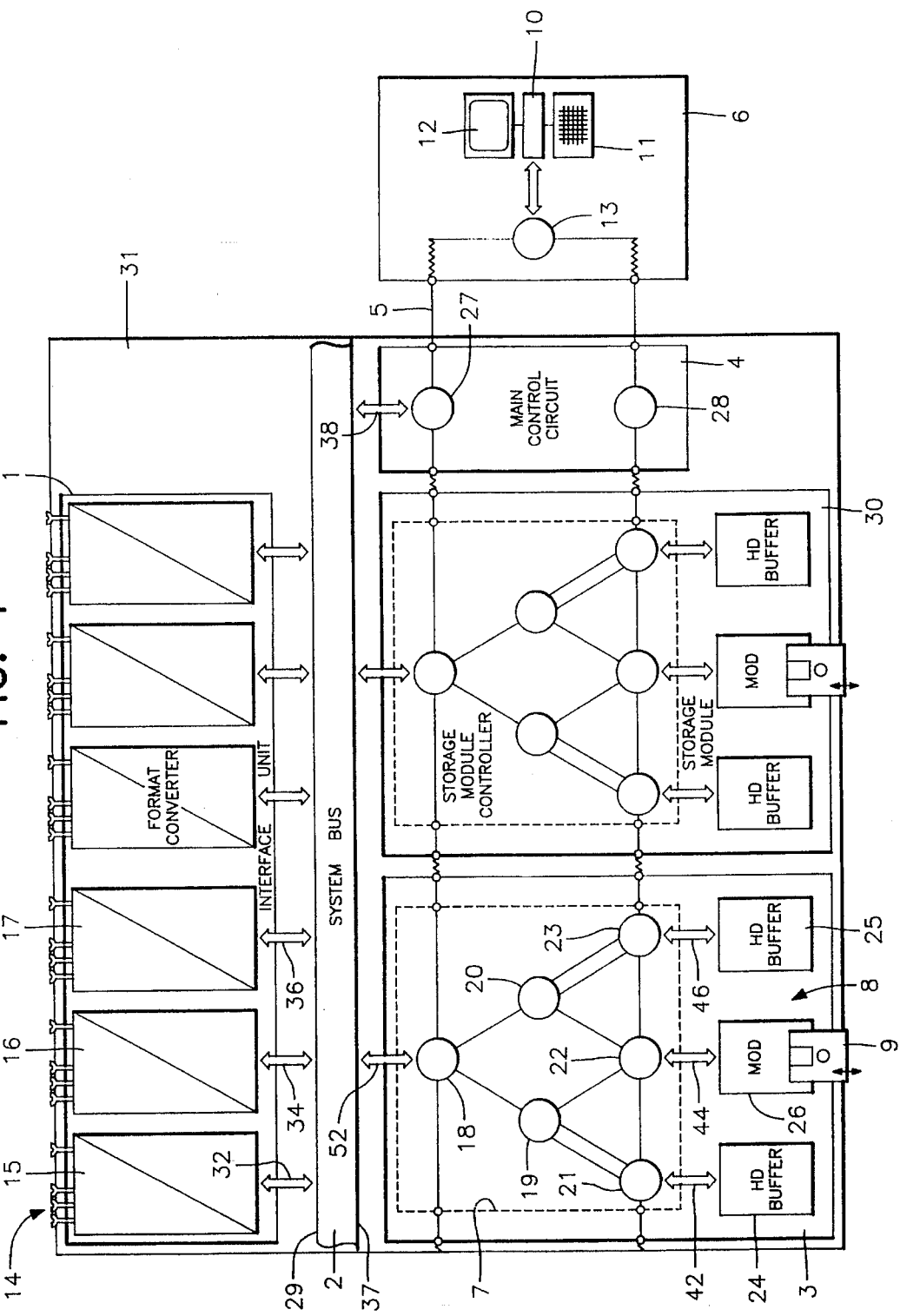

MULTI-CHANNEL DEVICE HAVING STORAGE MODULES IN A LOOP CONFIGURATION WITH MAIN CONTROL UNIT FOR CONTROLLING DATA RATES AND MODIFYING DATA SELECTIVELY AND INDEPENDENTLY THEREIN

This is a continuation of application Ser. No. 07/784,449, filed Nov. 13, 1991, which was abandoned upon the filing hereof.

BACKGROUND OF THE INVENTION

Description

The invention relates to a multi-channel device for the digital recording and playback of audio signals, with a plurality of digital or analog inputs and outputs and with one or more digital stores.

In multi-channel recording technology for audio signals, tape machines exist which operate in accordance with analog and digital technology for the recording and playback of audio signals and which are provided with a plurality of digital or analog inputs and outputs and a fixed number of channels.

In addition to the limited, predetermined number of channels, these devices have a limited playing time. Additionally, access to a specific tape position requires a time consuming search in which the precise tape position is not always reliably found. In the case of the re-recording of already recorded tape positions (overdubbing), after the re-recording it is no longer possible to shift the fade-in and fade-out points or to change the cross-fade time. As a result, valuable original recordings can be partially destroyed. For the assembly of individual music passages, mechanical editing, which destroys original recordings, is employed.

SUMMARY OF THE INVENTION

The aim of the present invention is, while providing an unlimited number of channels for recording and playback, to make available recording and playback facilities of unlimited time duration whereby, with instantaneous access to any desired position of the recording, overdubbing and editing can be carried out without risk and the time duration of the cross-fading can be freely selected.

For this purpose, it is provided in accordance with the invention that a bidirectional interface circuit provided with inputs and outputs is connected via a system bus, which conducts groups of parallel data, to one or more parallel connected storage modules, where a main control circuit driven by an operating unit is coupled to the system bus and to the storage module or modules, and that each storage module comprises at least one digital store, containing an exchangeable storage medium, and at least one digital buffer store, in such manner that the audio signals which are to be stored are kept available in the buffer store for their processing or during the exchange of the storage medium. An approximately full medium can be exchanged for an empty medium without interrupting the recording process as the items of audio information are received at the input of the buffer store at a lower rate than they can be written into the digital store containing the exchangeable storage medium at the output of the buffer store, and therefore the available recording time and, accordingly in the reverse direction of the data flow, the playback time is not limited by the characteristics of the device.

Expediently the main control circuit is connected to the storage modules via a communication ring which conducts control signals. It is also advisable to assign each storage module an independent controller which independently initiates, and monitors the execution of, the functions of the storage module triggered by the main control circuit.

The number of channels required for the recording can be extended as desired, in an expedient development of the invention, in that the device is assigned an appropriate number of storage modules which are connected in parallel to the system bus for the audio signals and are also controlled by the communication loop of the main control circuit. Each storage module can then be designed as a plug-in unit which can be plugged into a contact strip inside the device. The contact strip is connected to the system bus.

It is advisable for the operating unit to be equipped with a remote control device, the keys of which have a mechanical action and are assigned, for example, to the record, playback and stop functions. It is also advisable to provide the operating unit with a display and a device for pointing to display elements of the display; in this case, in the operating unit, the functions of the main control circuit can be assigned to a location or a sequence on the display or to a key sequence of the remote control device.

Suitable archive stores are exchangeable data carriers, such as magneto-optical, optical or magnetic disk stores or tape cassette stores.

Expediently, in the interface unit there are provided a plurality of parallel connected, bidirectional format converters which can read in and read out, at their inputs and outputs respectively, different, serial data formats with an internal or externally preset clock rate and on the other hand output onto the system bus and/or input from the system bus parallel data in groups with a standard, internal data format. The format converters are also designed as plug-in units and can be plugged onto a contact strip connected to the system bus.

Another advantage of significance in studio technology is achieved, by means of the possibility of carrying out multiple track editing using all the available channels without thereby destroying the original recordings. In addition, the facility exists for repeated playback or recording without interruption for a fixed interval of time. Time-compressed or time-expanded playback of recorded audio sounds retaining the original sound level is possible without a high outlay in computing time as the storage modules contain independent controllers which can execute the necessary computing process in parallel.

Intervention into the organization of the device can be carried out particularly easily if assemblies of the controller and assemblies of the interface circuit are designed as multiple programmable logic arrays, in which case the main control circuit preferably programs the multiple programmable logic arrays each time the device is switched on.

A particularly high level of flexibility in respect of administration, processing and transfer of the data within the device can be achieved if the controller and the main control circuit are composed of a network of subcontrollers, where the network connections between the individual subcontrollers have a standard signal and data format and the data exchange between the subcontrollers is carried out in serial fashion.

BRIEF DESCRIPTION OF THE DRAWINGS

FIGURE 1 is a schematic block diagram of the multi-channel device according to the present invention.

DETAILED DESCRIPTION OF THE DRAWINGS

The device substantially comprises an interface unit 1, one or more storage modules 3, 30, a main control circuit 4 and an operating unit 6. A system bus 2 connects the interface unit 1 via multiple lines 32, 34, 36 to the storage modules 3, 30.

During the various function procedures, the main control circuit 4 controls the data flows of the system bus 2 and for this purpose is connected to the system bus 2 via a multiple line 38. The main control circuit 4 also controls the function procedures of the storage modules 3, 30 and for this purpose is connected in serial fashion to the storage modules 3, 30 via a communication ring 5 which conducts control signals. The main control circuit 4 comprises a system subcontroller 27 and a master subcontroller 28, both of which are connected to the communication ring 5, although the system subcontroller is additionally connected to the system bus 2 via the multiple line 38.

The storage modules 3, 30 are of identical construction and therefore a description of the storage module 3 will suffice. The storage module 3 comprises a controller 7 and one or more storage units which have been commonly referenced 8 and each of which is connected to the controller 7 via multiple lines 42, 44, 46. In the described example the storage units 8 are designed as two magnetic disk drive units 24, 25 and a magneto-optical drive unit 26 containing a removable disk as data carrier 9. The storage modules 3, 30 are designed as plug-in units which are accommodated on a contact strip 29 of the system bus 2 and the communication ring 5 with the possibility of adding further units.

The controller 7 consists of a symmetrical network of subcontrollers 18 ... 23. The network connections between the individual subcontrollers, similarly to the communication ring 5, have a standard signal and data format, the data exchange being carried out in serial fashion. The I/O-subcontroller 18 is connected to the system bus 2 via a multiple line 52. Network connections also exist to the two RAM- subcontrollers 19, 20 and to the communication ring 5. Each of the RAM- subcontrollers 19, 20 contains a local buffer store.

The RAM- subcontroller 20 is connected to the SCSI-subcontroller 23, which is itself connected to the magnetic disk store 25. The RAM- subcontroller 19 is connected to the SCSI- subcontroller 21, which is itself connected to the magnetic disk store 24. The SCSI- subcontroller 22 is connected to the two RAM- subcontrollers 19, 20 and to the magneto-optical disk store 26. All the SCSI- subcontrollers 21, 22, 23 are included in the communication ring 5.

The interface unit 1 accommodates bidirectional, parallel connected format converters 15, 16, 17, each of which is connected to the system bus 2 via plug-in points by means of the multiple lines 32, 34, 36. Each format converter 15, 16, 17 is provided with input- and/or output sockets 14 which allow the user to connect external signal sources and/or receivers to the device.

The operating unit 6 is included in the communication ring 5 and comprises a personal computer 10 with a graphic display 12 and a remote control device 11, both of which are connected to the communication ring 5 by means of a controller 13. The keys of the remote control unit 11 have a mechanical action and are assigned, for example, to the playback, record and stop functions. The personal computer with graphic display represents function states, procedures and references of the device in graphic form and is equipped with a device for pointing to display elements of the display 12, here in the form of a trackball 13.

The function of the device in the operating state will be described in detail in the following.

The interface unit 1 accommodates format converters 15 which can be combined in any desired fashion and which allow the device to be connected to equipment commonly used in studio technology (mixer desks, tape machines, audio-processors etc). Here the serial data streams received at the inputs of the format converters 15, 16, 17 are input with a selectable bit rate and, in a sequence, the bits which bear the audio information and additional control bits are differentiated, ordered and fed as parallel data words to the system bus 2. In the reverse direction of the data flow, parallel data words are received via the system bus 2 by the format converters 15, 16, 17 and the sequence composed of the bits which bear the audio information and additional control bits is ordered in such manner that the produced data streams, which are transmitted with a selectable bit rate from the outputs of the format converters 15, 16, 17, can be read and analysed by the equipment connected to the device.

The system bus 2 allows the device to be expanded at any time by further inputs and outputs by the possibility of adding the format converters 15, 16, 17, which are designed as plug-in units and which are connected to the system bus 2 by the multiple lines 32, 34, 36 and the contact strip 29.

The system bus 2 also allows the device to be expanded at any time by further recording and playback capacity both in respect of the available audio channels and also in respect of the available recording time, by the possibility of adding to the storage modules 3, which are designed as plug-in units and which are connected to the system bus 2 by the multiple line 52 and the contact strip 29.

The system bus 2 transports audio data words between the format converters 15, 16, 17 themselves, between the format converters 15, 16, 17 and the storage modules 3 and vice versa, and between the storage modules 3 themselves.

The execution of the data transport on the system bus 2 is coordinated by the main control circuit 4. Here, in a periodically repeated sequence of data words, one position within this sequence corresponds to a specific audio channel. By predetermining the position within the sequence, each input or output of the format converters 15, 16, 17 and each channel of the storage modules 3 is allocated a channel number. The main control circuit 4 can change the sequence and thus influences the channel allocation within the device. In this way, by simple reprogramming, the need for very time consuming rewiring of the connected equipment, which would otherwise be required, is obviated.

The main control circuit 4 converts the functions of the device, specified by the operator via the operating unit 6, into corresponding data flow sequences within the device. For this purpose the storage modules 3 and the operating unit 6 are connected by a communication ring 5 to the main control circuit 4. The user's commands input into the operating unit 6 are forwarded by means of the communication ring 5 to the main control circuit 4, which converts these commands into control sequences and forwards them again, by means of the communication ring 5, to the storage modules 3.

The storage modules 3 comprise an independently operating controller 7 and one or more storage units 8. The controller 7 can obtain simultaneous access to all the storage units 8 assigned to the storage module 3. Here each controller 7 receives parallel data words from the system bus 2 via the I/O- subcontroller 18, transmits the received data words to the two RAM- subcontrollers 19, 20 functioning as local buffer stores, and at a later time stores these data words by the SCSI- subcontrollers 21, 22, 23, in one of the storage units 8. In the reverse direction of data flow, by means of the SCSI- subcontrollers 21 . . . 23, the controller 7 returns the data words stored in the storage units 8 into the local buffer stores of the RAM-subcontrollers 19, 20 from where, at a later time, at the request of the main control circuit 4, they are fed by means of the I/O- subcontroller 18 to the system bus 2. The local buffer stores of the RAM- subcontrollers 19, 20 are designed in such manner that data streams can flow from or to the storage units 8 simultaneously and always at the maximum data flow speed determined by the storage units 8.

The storage modules 3, in accordance with the system bus 2, are electrically, functionally and mechanically designed such that at any time it is possible to add to the storage modules 3 in the device 3 in order to extend both the playing time and expand the number of available channels of the device.

Each storage module 3 is responsible for the recording of eight audio channels. For this purpose the items of audio information received by the I/O- subcontroller 18 and intermediately stored in the RAM- subcontrollers 19, 20 are firstly temporarily stored in the magnetic disk stores 24, 25. They are thus immediately available for playback. If the user wishes to listen to a specific passage of a pre-recording, the appropriate items of audio information are retrieved from the magnetic disk stores 24, 25 into the RAM- subcontrollers 19, 20 and rendered audible by means of the I/O- subcontroller 18, the system bus 2 and the format converters 15, 16, 17. Here the access times of the magnetic disk stores 24, 25 are so short that they are imperceptible to the user, i.e. he can obtain instantaneous, direct access to any desired position of a pre-recording.

In a parallel process operating independently in the background, the items of audio information of a new recording, temporarily stored in the magnetic disk stores 24, 25, are read out again and are buffered by the RAM-subcontrollers 19, 20, whereupon they are finally written onto the data carrier 9 by means of the optical disk store 26. The recording can now be removed from the device and filed. Furthermore, all the items of audio information are thus doubly stored— on the one hand in the magnetic disk stores 24, 25 and on the other hand in the optical disk store 26. In the case of overdubbing, i.e. the attempt to improve specific passages of a recording by re-recording this passage, the data of the new recording is firstly stored only in the magnetic disk stores 24, 25, and thus the data of the passage to be improved remains, unaffected, in the optical disk store 26. The data of the new recording, and also the data of the recording which is to be improved, remain unchanged until confirmation is received from the user that the new recording is successful.

In order to judge whether the new recording is successful, the cross-fading to the improved passage and back is merely simulated for the user. He can then subsequently change the times and the duration of the cross-fading. If he rejects the new recording, the data of the passage to be improved is copied back from the optical disk store into the magnetic disk stores and the new recording is thus cancelled. On the other hand, if the user confirms that the new recording with the selected cross-fading is successful, the data of the new recording, including the corresponding cross-fading, is copied from the magnetic disk stores into the optical disk store. As a result overdubbing can be carried out by means of the disclosed device without any risk.

In the case of editing, i.e. the assembly of completed recordings in a new sequence desired by the user, the recording data again remains unaffected. Only the sequence and the cross-fading time with which the individual recordings are to-be played back, are stored. The user can change the sequence and cross-fading time as required or can also return to the still unchanged version. In this way editing is completely risk-free.

To facilitate continuous recordings of arbitrary duration, the data carrier 9 can also be exchanged while recording is in progress. For this purpose the magnetic disk stores 24, 25 function as intermediate buffers with first-in-first-out characteristics. The items of audio information are written directly into the optical disk store 26 until the data carrier 9 is full. It can now be exchanged for an empty data carrier. The items of audio information received during the exchange procedure are now intermediately stored in the magnetic disk stores 24, 25, from which they are then written onto the new data carrier 9 in the correct time sequence. Within a given interval of time, fewer items of audio information are received at the input of the intermediate buffer, (the magnetic disk stores 24, 25) than are written into the magneto-optical disk store 26 at the output. As a result, the intermediate buffer is empty again within a sufficient length of time following the exchange of the data carrier 9, and the items of audio information can again be directly written into the optical disk store 26 until the new data carrier 9 is full again. This means that the exchange of a full data carrier 9 for an empty data carrier can be repeated as often as required. The information items recorded on the data carriers 9 are combined continuously to form a recording of any desired time duration.

We claim:

1. A multi-channel device for digital recording and playback of audio signals; the multi-channel device comprising:

a bidirectional interface unit having inputs and outputs;

a system bus to which the bidirectional interface unit is connected;

one or more storage modules each connected to the system bus to receive groups of data in parallel;

a main control circuit;

an operating unit for driving the main control circuit and being coupled to the system bus and to the one or more storage modules through the main control circuit; and wherein each storage module comprises at least one digital storage circuit for receiving a removable storage medium and for storing data onto the removable storage medium, and at least one digital buffer storage circuit, the storage module storing, in the at least one digital buffer storage circuit data representative of audio signals which are to be stored for processing or during the exchange of the removable storage medium in the digital storage circuit, each storage module further comprising storage module controller means for transferring data between said digital buffer storage circuit and the system bus at a first rate, and for transferring data between the digital buffer storage circuit and the digital storage circuit at a second rate that is faster that the first rate;

a communication circuit loop which connects the main control circuit to the storage modules; and wherein data contained in said at least one digital buffer storage circuit is modifiable by the storage module in a selectively independent manner from data transferred to the digital storage circuit.

2. A device as claimed in claim 1, wherein each storage module controller means is responsive to control signals supplied by said main control circuit via said communication circuit loop and wherein the digital storage circuit comprises at least one disk drive unit for storing data to the removable storage medium and the digital buffer storage circuit is a first-in-first-out circuit.

3. A device as claimed in claim 1, and further comprising a contact strip connected to the system bus and storage modules, and a housing enclosing the contact strip and storage modules, the storage modules being plug-in units which are received by said contact strip, and wherein the contact strip is capable of receiving additional storage modules.

4. A device as claimed claim 1, wherein the main control circuit controls data flow between the system bus and the communication circuit loop.

5. A device as claimed in claim 1, wherein the operating unit comprises a remote control device with a display and a pointing device for pointing to display elements of the display, said remote control device comprising keys assigned to certain playback and stop functions, and the display graphically displays function states, sequences and references of the device, and the functions of main control unit are assigned to a position on the display or to a key sequence of the remote control device, and wherein the pointing device triggers functions of the main control circuit by pointing to certain display regions of the display.

6. A device as claimed in claim 1, wherein the digital storage circuit comprises a magnetic disk drive and the digital buffer storage circuit comprises an optical disk drive.

7. A device as claimed in claim 1, wherein the bidirectional interface unit comprises plug ports for connecting to a plurality of bidirectional format converters connected in parallel between the system bus and interface unit, the bidirectional format converters receiving as input and generating as output different serial data formats with respect to a preset clock rate and the bidirectional format converters output onto the system bus and receive as input from the system bus groups of data in parallel with a standard internal data format.

8. A device as claimed in claim 1, and further comprising an operating unit and a housing for mounting and enclosing therein the bidirectional interface unit, the system bus the at least one storage module, the main control circuit and the operating unit.

9. A device as claimed in claim 7, and further comprising a contact strip connected to the system bus and a housing for enclosing the contact strip, format converters and system bus, wherein the format converters are plug-in units which are received by the contact strip.

10. A device as claimed in claim 2, wherein each storage module controller means and the bidirectional interface unit comprises multiple programmable logic arrays, and the main control circuit programs the multiple programmable logic arrays each time the device is switched on.

11. A device as claimed in claim 1, wherein each storage module controller means comprises a network of subcontrollers for exchanging data between the at least one digital buffer storage circuits and the system bus, wherein the main control circuit and the network of subcontrollers have a standard signal and data format, and data exchange between the subcontrollers is serial.

12. The device of claim 1, wherein each storage module controller means comprises:

I/O subcontroller means connected to the system bus to receive data;

local buffer storage means connected to the I/O subcontroller means and receiving the data; and interface subcontroller means connected to the local buffer storage means for storing the data into the digital buffer storage circuit at the first rate.

13. The device of claim 12, wherein the interface subcontroller means comprises SCSI subcontrollers.

\* \* \* \* \*